US006482319B2

United States Patent
Houck et al.

(12) United States Patent
(10) Patent No.: US 6,482,319 B2
(45) Date of Patent: *Nov. 19, 2002

(54) IN-LINE FILTRATION SYSTEM FOR TREATMENT OF SEPTIC TANK EFFLUENT

(76) Inventors: Michael H. Houck, P.O. Box 956, Brevard, NC (US) 28712; Thomas K. Weaver, 123 Buena Vista, Brevard, NC (US) 28712

(*) Notice: Subject to any disclaimer, the term of this patent is extended or adjusted under 35 U.S.C. 154(b) by 0 days.

This patent is subject to a terminal disclaimer.

(21) Appl. No.: 10/141,314

(22) Filed: May 8, 2002

(65) Prior Publication Data

US 2002/0125186 A1 Sep. 12, 2002

Related U.S. Application Data

(63) Continuation of application No. 09/483,927, filed on Jan. 18, 2000.

(51) Int. Cl.$^7$ .............................. C02F 1/00; B01D 29/11
(52) U.S. Cl. .................... 210/282; 210/86; 210/484; 210/532.2
(58) Field of Search .................... 210/86, 170, 282, 210/287, 435, 470, 500.34, 532.2, 289, 291, 484; 405/43

(56) References Cited

U.S. PATENT DOCUMENTS

| | | | | | |
|---|---|---|---|---|---|
| 977,965 A | * | 12/1910 | Paul | ............................ | 210/150 |
| 3,954,612 A | * | 5/1976 | Wilkerson | ................... | 116/228 |
| 5,595,652 A | * | 1/1997 | Rainer | ......................... | 210/263 |
| 5,997,735 A | * | 12/1999 | Gorton | ........................ | 210/151 |
| 5,997,747 A | * | 12/1999 | Jowett | ......................... | 210/269 |
| 6,277,280 B1 | * | 8/2001 | Houck | ......................... | 210/119 |
| 6,383,372 B1 | * | 5/2002 | Houck et al. | ................ | 210/150 |

* cited by examiner

Primary Examiner—David A. Simmons
Assistant Examiner—Frank M. Lawrence
(74) Attorney, Agent, or Firm—Allen, Dyer, Doppelt, Milbrath & Gilchrist, P.A.

(57) ABSTRACT

An apparatus and method for treatment of waste water effluent includes a main conduit connected to a source of waste water, and a removable filter positioned within the main conduit, the filter comprising a light weight particulate material for filtration of the effluent. A drain field for filtration treatment of waste water effluent comprises a source of waste water effluent, a main conduit in fluid connection with the source of waste water, and at least one in-line filter positioned within the main conduit, the filter comprising light weight particulate material. The drain field may comprise at least one extension conduit connected in fluid communication with the main conduit and extending substantially upwardly therefrom, said extension conduit having a removable cap comprising a sensor to thereby generate a signal when water in said extension conduit reaches a predetermined level.

13 Claims, 3 Drawing Sheets

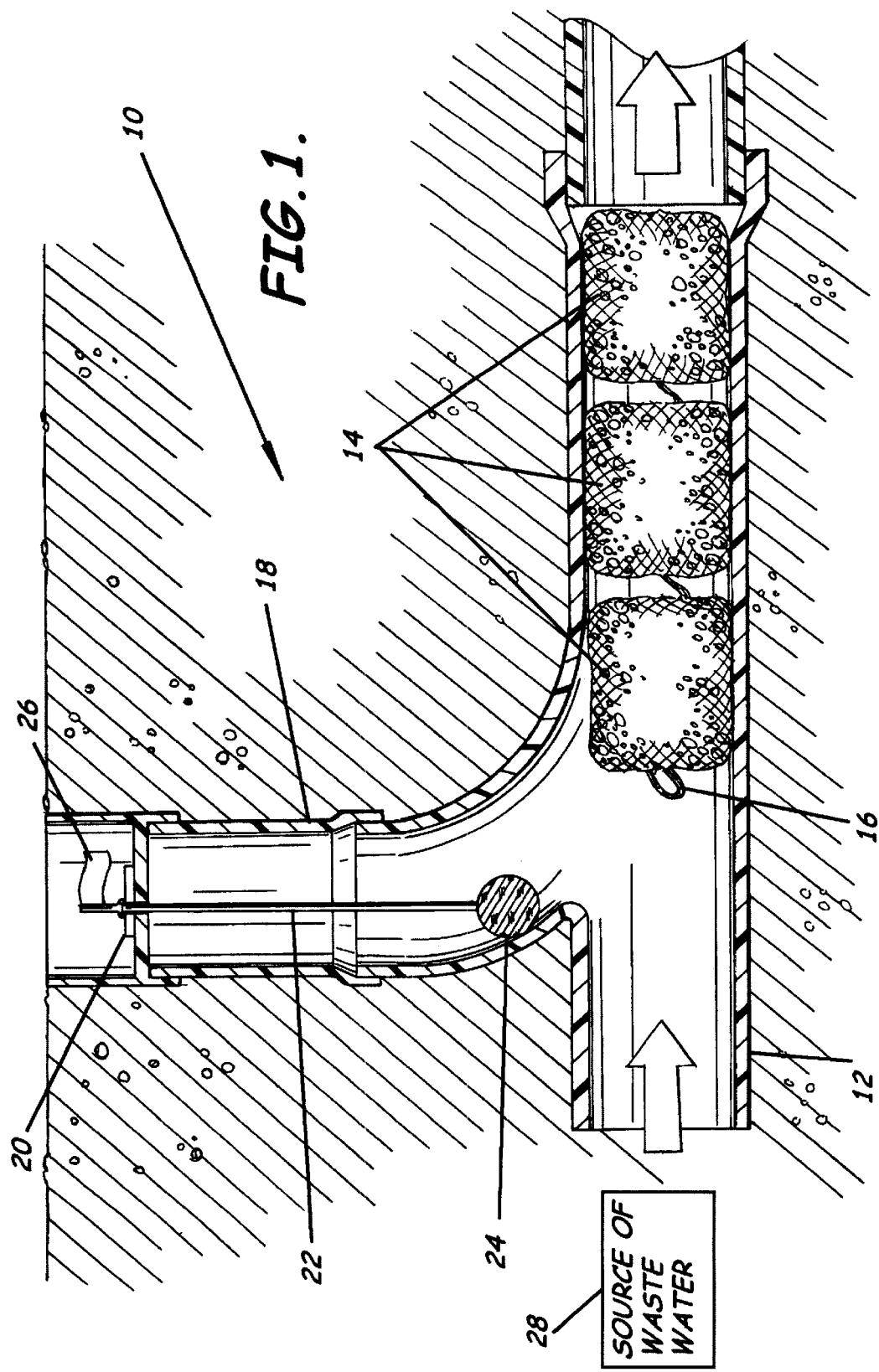

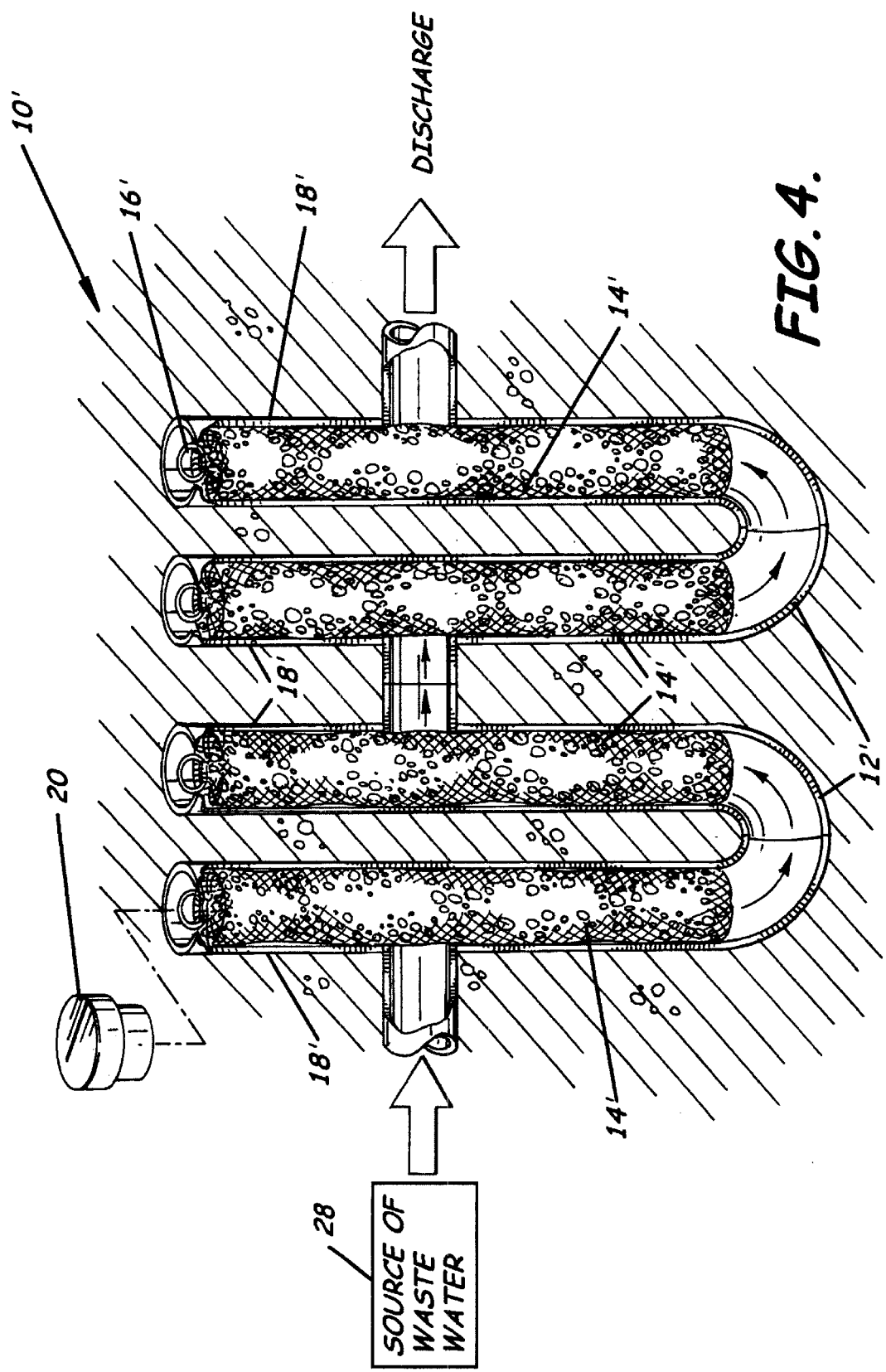

IN-LINE FILTRATION SYSTEM FOR TREATMENT OF SEPTIC TANK EFFLUENT

This application is a continuation of U.S. patent application Ser. No. 09/483,927, filed Jan. 18, 2000, now allowed.

FIELD OF THE INVENTION

The present invention relates to the field of treatment of septic tank effluent prior to disposal and, more particularly, to in-line filters for treatment of the effluent.

BACKGROUND OF THE INVENTION

Conventional drainage fields for land application of septic tank sewage effluent are constructed by digging trenches on land adjoining the septic tank. Filtering beds are created in these trenches by depositing a layer of filtering material in the bottom of the trenches. Conventional filtering material is rock, crushed stone gravel, sand, or a combination thereof. A network of perforated pipe is connected to the septic tank and laid in the trenches on top of the filter bed. Such systems normally operate by gravity flow, however, it is common practice to connect a pump to the septic tank to aid in moving the sewage effluent from the septic tank and through the drainage field, particularly where required by the lay of the land. The sewage effluent is distributed through the network of perforated pipes and trickles onto and through the filter bed, where its nutrient content is reduced by microbial action. After passing through the filtering material, the sewage effluent is absorbed by the soil surrounding and underlying the trench.

Standard practices, however, suffer from severe disadvantages. For example, conventional drainage fields for septic tanks require the transportation of heavy materials, such as the stone, rock gravel or sand required for installing filtration beds. In addition, conventional drainage fields generally operate for years, however, they must be dug up and replaced when they become clogged or otherwise stop functioning as designed. Replacement of the drainage field costs essentially as much as installing a completely new field, and perhaps more.

SUMMARY OF THE INVENTION

With the foregoing in mind, the present invention advantageously provides in-line filters for providing treatment for septic tank effluent. The in-line filters may be positioned to treat the effluent before it reaches a conventional drainage field, or may be employed in series as a replacement for the conventional drainage field.

The invention discloses an in-line filtration system for treatment of waste water effluent preferably from a septic tank. A main conduit is connected to a source of waste water, and a filter is positioned within the main conduit. The filter is preferably removable and comprises light weight particulate material, which may preferably be expanded polystyrene, or rubber chips such as from ground tires. The filtering particles are contained in a water permeable sleeve, preferably a mesh, the filter having a handle or other member for aiding in removing the filter from the system.

The system may include an extension conduit connected with the main conduit and extending substantially upwardly therefrom. The extension conduit has a removable cap for providing interior access to the system, such as for removing and replacing filters. The cap comprises a sensor for generating a signal when water in the extension conduit reaches a predetermined level. The sensor may be mechanical or electronic.

The system may additionally include a plurality of filters positioned within the main conduit, the filters comprising light weight particulate material substantially graded in size so as to include relatively larger particles positioned upstream and relatively smaller particles positioned downstream for providing enhanced filtration treatment for the waste water effluent.

The invention also includes a drain field for filtration treatment of waste water effluent, preferably from a septic tank. The drain field comprises a source of waste water effluent, a main conduit connected to the source of waste water, and a plurality of in-line filters positioned within the main conduit, the plurality comprising light weight particulate material to thereby provide filtration treatment for the waste water effluent. The plurality of filters is removable from the system to thereby allow for washing of the filters, or replacement with new filters. The plurality of filters comprises a retrieval member for aiding in removal of the filters, a handle being a preferred retrieval member. The drain field includes at least one extension conduit connected in fluid communication with the main conduit and extending substantially upwardly therefrom. The extension conduit has a removable cap for providing interior access to the system. The cap comprises a mechanical or electronic sensor for generating a signal when water in the extension conduit reaches a predetermined level.

In addition, a method aspect of the invention includes the step of filtering the effluent through a conduit disposed with a removable filter comprising a plurality of filtering particles of light weight material. The conduit of the method may include substantially vertical portions.

Accordingly, the present invention provides various advantages over prior art systems. The invention allows increased filtration of the waste water effluent in less land area. The system provides for progressive filtration before the waste water effluent reaches a conventional drain field, thereby extending the useful life of the drain field. The invention provides for signaling to indicate possible clogging of the system. The system provides easily removable filters, for washing or replacement of the filters. The filters may be made in various sizes to accommodate small and large capacity septic tank waste water treatment systems, and the filters are made of low cost, recycled media.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 1 is a cross section side view of the in-line filter system according to an embodiment of the present invention;

FIG. 4 shows a cross section side view of the U-shaped embodiment of the present invention joined together in a plurality of filters forming a drain field.

DETAILED DESCRIPTION

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime notation when used indicates similar elements in alternative embodiments.

FIGS. 1 through 4 illustrate an in-line filtration system 10 for treatment of waste water effluent in its various preferred embodiments. The system comprises a main conduit 12 connected to a source of waste water, and a filter 14 positioned within the main conduit. The filter 14 comprises a light weight particulate material for providing filtration treatment for the waste water effluent as it flows through the conduit. A preferred source of waste water effluent for the system is a septic tank.

As shown in FIG. 1, the filter 14, also referred to as an in-line filter, comprises light weight particulate material selected from expanded polystyrene, and rubber chips. A preferred source of rubber chips includes ground up tires, providing an inexpensive and environmentally friendly source of filtering particles. In a preferred embodiment, the in-line filter is removable from the main conduit 12 for allowing for replacement with a new filter, or for washing of the filter. As shown in FIGS. 1–4, the filter 14 also preferably comprises a water permeable sleeve, which may be a mesh, for substantially containing the light weight particulate material. Those skilled in the art will readily recognize that the mesh may be made of any suitable, water resistant material, and may preferably be made of a synthetic material. In addition, the light weight particulate material which the filter comprises may be loose, rather than contained within a water permeable sleeve. Where the filter comprises a sleeve, the filter 14 may advantageously further be provided with a retrieval member 16 for aiding in removal of the filter from the system, the retrieval member preferably being a handle connected to the filter.

Figure 3:
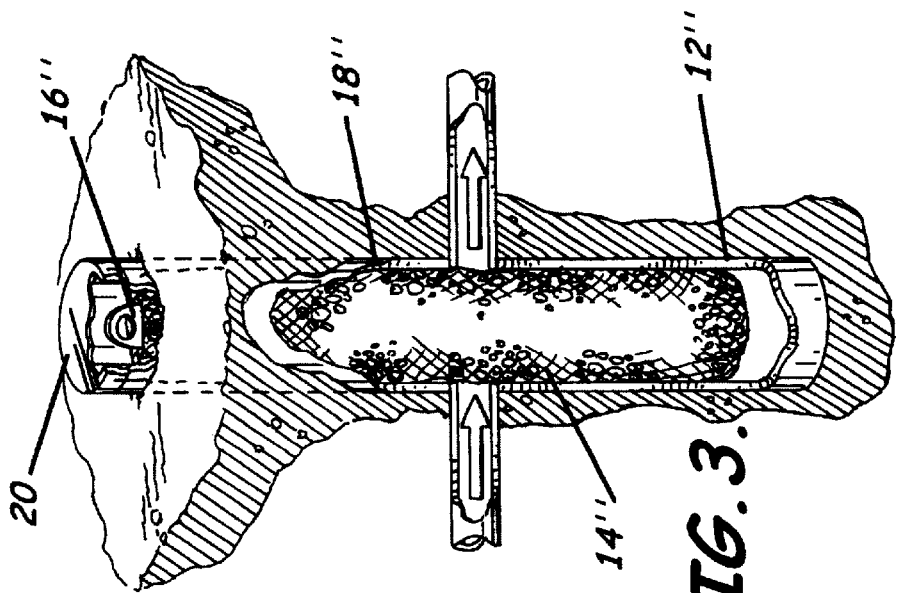
FIG. 3 shows a cross section side view of yet another embodiment of the in-line filter of FIG. 1.
Figure 2:
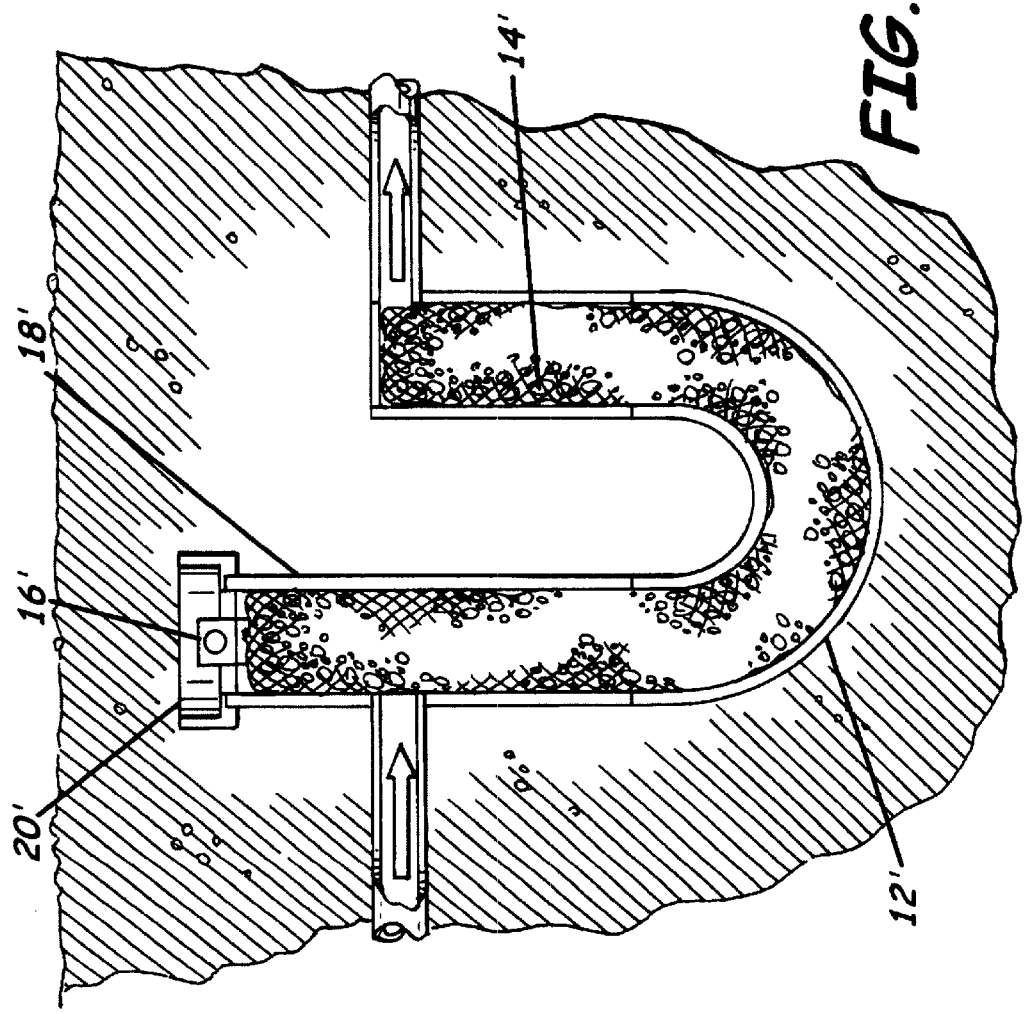
FIG. 2 illustrates a cross section side view of another embodiment of the in-line filter of FIG. 1.

The system may further include an extension conduit 18 connected in fluid communication with the main conduit 12 and extending substantially upwardly therefrom, as shown in FIG. 1. The extension conduit 18 may be disposed with a removable cap 20 for providing interior access to the system. Additionally, and of great advantage, the cap may comprise a sensor 22 for generating a signal when water in the extension conduit reaches a predetermined level. Such a signal would generally indicate the possibility that the filtration system may be clogging and that one or more filters may need changing. In addition, the skilled person will recognize that the sensor may be a mechanical sensor comprising a float 24 and mechanical indicator 26 connected thereto for generating the signal, or that the sensor may be an electronic sensor for generating an electrical signal. The skilled artisan will also understand that such extension conduits and sensors could be placed strategically throughout a large drain field system to provide system status information as an aid in optimizing treatment of the waste water. Other preferred embodiments of the in-line filter system are shown in FIGS. 2 and 3.

In another preferred embodiment shown in FIG. 4, the system 10' may further include a plurality of filters 14' positioned within the main conduit 12'. In this embodiment, the main conduit 12' comprises a U-shape wherein the filters 14' are positioned. An extension conduit 18' projects above the main conduit 12' for providing access to the system for removal of the filters 14'. The plurality of filters preferably comprises light weight particulate material substantially graded in size so as to include relatively larger particles positioned upstream and relatively smaller particles positioned downstream. By including such a size gradient of filtering particles, the system provides a filter which increases in surface area as the waste water flows downstream. Where a plurality of in-line filters are positioned in the conduit, the particle size gradient may be provided by including the larger particles in the first upstream filter, followed by downstream filters each having progressively smaller particles.

Skilled practitioners understand that this type of filtration relies on the accumulation of microbial biomass on the filter surfaces for reducing the nutrient content of the waste water through the metabolic activity of the microbial film. Smaller particles provide a filter having larger surface area for growing the microbial film. The larger the filter surface, therefore, the more efficient the filtration treatment becomes due to the greatly increased accumulation of microbial biomass. Additionally, the skilled worker will know that the illustrated shapes for the in-line filter do not affect the filtration efficiency of the filter and may be varied according to the requirements of the job and/or the site.

Yet another preferred embodiment of the invention includes a drain field for filtration treatment of waste water effluent. The drain field comprises a source of waste water effluent 28 connected to the present invention, as shown in FIGS. 1 and 4, including a main conduit in fluid connection with said source of waste water, and a plurality of in-line filters positioned within said main conduit, the filters as described above. A preferred source of waste water effluent for the drain field is a septic tank.

The system of the present invention may comprise the entire drain field, in effect, substituting for a conventional septic tank drain field. Alternatively, the present drain field may be built to include elements from a conventional septic tank drain field, such as for example septic tank drainage trenches constructed in the conventional manner and supplied with septic tank effluent through the present in-line filters. Combining the present invention with a conventional septic tank drain field would provide the advantage of extending the useful life of the conventional drain field. The removable inline filters of the present invention would be used to further treat the effluent from the septic tank before it reaches the conventional drain lines. Such pre-treated effluent contains lower levels of nutrients and would be substantially cleaner, thus delaying the eventual clogging of the conventional drain lines. The removable nature of the in-line filters results in components which may be indefinitely renewable.

A method aspect of the invention for treating waste water effluent from a septic tank includes the step of filtering the effluent through a conduit 12 disposed with a removable filter 14 comprising a plurality of filtering particles of light weight material. In the method, the conduit may preferably include substantially vertical portions, as shown in FIGS. 2, 3, and 4. Vertical portions provide the added advantage of allowing installation of more filters in a smaller area of land.

In an embodiment of the method, the filtering step comprises passing the effluent through filtering particles graded in size so as to include relatively larger particles positioned upstream and relatively smaller particles positioned downstream.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

What is claimed is:

1. An in-line filtration system for treatment of waste water, said filtration system comprising:
   a non-perforated U-shaped conduit having an interior passage in fluid connection with a source of waste water for waste water to flow therethrough; and
   a filter comprising a water permeable sleeve defining a periphery of said filter and containing light weight particulate material, said filter positioned within the interior passage of said U-shaped conduit having the periphery extending to contact side walls of the interior passage so that said filter fully occupies a length of the interior passage of said conduit to thereby substantially prevent waste water from bypassing said filter.

2. The system of claim 1, wherein said source of waste water comprises a septic tank.

3. The system of claim 1, wherein said light weight particulate material is selected from the group consisting of expanded polystyrene, and rubber chips.

4. The system of claim 1, wherein said filter is removable from said non-perforated conduit.

5. The system of claim 1, wherein said filter comprises a retrieval member for aiding in removal of the filter.

6. The system of claim 1, wherein said filter comprises a handle for aiding in removal of the filter.

7. The system of claim 1, wherein said water permeable sleeve comprises a mesh.

8. The system of claim 1, wherein said non-perforated U-shaped conduit includes an extension extending substantially upwardly therefrom and having a removable cap for providing interior access to the system.

9. The system of claim 8, further comprising a sensor for generating a signal responsive to a predetermined water level in said extension conduit.

10. A drain field for filtration treatment of septic tank waste water, said drain field comprising:
    a septic tank source of waste water;
    a non-perforated cylindrical pipe conduit having an interior passage in fluid connection with said septic tank source, a first portion of said non-perforated cylindrical pipe conduit positioned underground downstream from the septic tank for the waste water to flow therethrough, and a second portion of said non-perforated cylindrical pipe conduit positioned extending upwardly from said first portion to an open end positioned at about ground level, the open end having a removable cap thereon, and comprising a sensor associated with said removable cap to thereby generate a signal responsive to a predetermined water level within said non-perforated cylindrical pipe conduit; and
    a filter comprising a water permeable sleeve defining a periphery of said filter and containing lightweight particulate material, said filter positioned within said first portion of the non-perforated cylindrical conduit having the periphery extending to contact side walls of the interior passage so that said filter fully occupies a length of the interior passage of said non-perforated cylindrical conduit to thereby substantially prevent waste water from bypassing said filter.

11. The drain field of claim 10, wherein said sensor comprises a float and a mechanical indicator connected thereto for generating the signal.

12. The drain field of claim 10, wherein said sensor comprises an electronic sensor.

13. The drain field of claim 10, wherein said filter further comprises a plurality of filters.

* * * * *